United States Patent [19]
Cox et al.

[11] Patent Number: 5,915,027
[45] Date of Patent: Jun. 22, 1999

[54] DIGITAL WATERMARKING

[75] Inventors: Ingemar J. Cox, Lawrenceville, N.J.; Matthew L. Miller, Vilnius, Lithuania; Kazuyoshi Tanaka; Yutaka Wakasu, both of Tokyo, Japan

[73] Assignees: NEC Research Institute, Princeton, N.J.; NEC Corporation, Tokyo, Japan

[21] Appl. No.: 08/746,022

[22] Filed: Nov. 5, 1996

[51] Int. Cl.[6] ................................................ H04L 9/02
[52] U.S. Cl. ................................................... 380/54
[58] Field of Search ................................ 388/28, 51, 54

[56] References Cited

U.S. PATENT DOCUMENTS

| | | | |
|---|---|---|---|
| 4,939,515 | 7/1990 | Adelson | 341/51 |
| 5,319,735 | 6/1994 | Preuss et al. | 395/2.14 |
| 5,530,751 | 6/1996 | Morris | 380/4 |
| 5,530,759 | 6/1996 | Braudaway et al. | 380/54 |
| 5,568,570 | 10/1996 | Rabbani | 382/238 |
| 5,613,004 | 3/1997 | Cooperman et al. | 380/28 |
| 5,636,292 | 6/1997 | Rhoads | 382/232 |
| 5,646,997 | 7/1997 | Barton | 380/23 |
| 5,659,726 | 8/1997 | Sanford, II | 395/612 |
| 5,687,236 | 11/1997 | Moskowitz et al. | 380/28 |
| 5,734,752 | 3/1998 | Knox | 380/54 |

FOREIGN PATENT DOCUMENTS

| | | | |
|---|---|---|---|
| 0690595 | 1/1995 | European Pat. Off. | |
| 2196167 | 4/1988 | United Kingdom | |
| 8908915 | 9/1989 | WIPO | |
| 9520291 | 7/1995 | WIPO | |
| 9621290 | 7/1996 | WIPO | H04H 1/00 |
| 9625005 | 8/1996 | WIPO | H04H 7/08 |
| 9627259 | 9/1996 | WIPO | |

OTHER PUBLICATIONS

R.G. Van Schyndel et al, "A digital watermark," in Intl. Conf. On Image Processing, vol. 2, pp. 86–90, 1994.

G. Caronni, "Assuring Ownership Rights for Digital Images," in Proc. Reliable IT Systems, VIS '95, 1995.

J. Brassil et al, "Electronic Marking and Identification Techniques to Discourage Document Copying," in Proc. Infocom '94, pp. 1278–1287, 1994.

K. Tanaka et al, "Embedding Secret Information into a Dithered Multi–level Image," in IEEE Military Comm. Conf., pp. 216–220, 1990.

K. Mitsui et al, "Video–Steganography: How to Secretly Embed a Signature in a Picture," in IMA Intellectual Property Project Proc., vol. 1, pp. 187–206, 1994.

Macq and Quisquater, "Cryptology for Digital TV Broadcasting," in Proc. of the IEEE, vol. 83, No. 6, pp. 944–957, 1995.

W. Bender et al, "Techniques for data hiding," in Proc. of SPIE, vol. 2420, No. 40, Jul. 1995.

Koch, Rindfrey and Zhao, "Copyright Protection for Multimedia Data," in Proc. of the Int'l Conf. on Digital Media and Electronic Publishing (Leeds, UK, Dec., 6–8 1994).

Koch and Zhao, "Towards Robust and Hidden Image Copyright Labeling," in Proc. of 1995 IEEE Workshop on Nonlinear Signal and Image Processing (Neos Marmaras, Halkidiki, Greece, Jun. 20–22, 1995.

Zhao and Koch, "Embedding Robust Labels Into Images For Copyright Protection," in Proc. Int. Congr. on IPR for Specialized Information, Knowledge and New Technologies (Vienna, Austria), Aug. 21–25, 1995.

"Digital Copyright: Who Owns What?" NewMedia, Sep. 1995, pp. 38–43.

"Publish and Be Robbed?" New Scientist, Feb. 18, 1995, pp. 32–37.

(List continued on next page.)

*Primary Examiner*—Salvatore Cangialosi
*Attorney, Agent, or Firm*—Philip J. Feig

[57] ABSTRACT

Digital watermarking of data, including image, video and audio data, is performed by repeatedly inserting the watermark into subregions or subimages of the data. Similarly, the watermark is repeatedly extracted from the subregions of the data.

28 Claims, 8 Drawing Sheets

OTHER PUBLICATIONS

Kohno et al, "Spread Spectrum Access Methods for Wireless Communications," in IEEE Communications Magazine, Jan. 1995, pp. 58–67, I16.

Campana and Quinn, "Spread spectrum communications," in IEEE Potentials, Apr. 1993, pp. 13–16.

Mowbray and Grant, "Wideband coding for uncoordinated multiple access communication," in Electronics & Communication Engineering Journal, Dec. 1992, pp. 351–361.

Digimarc Overview & "Wired" Magazine article (Jul. 1995 issue)—(Jun. 1995).

A.G. Bors et al., "Image Watermarking Using DCT Domain Constraints", Dept. Of Informatics, University of Thessaloniki.

I.J. Cox et al., "Secure Spread Spectrum Watermarking for Multimedia", NEC Research Institute, Technical Report 95–10.

H.S. Stone, "Analysis of Attacks on Image Watermarks with Randomized Coefficients", NEC Research Institute, May 17, 1996.

F.M. Boland et al., "Watermarking Digital Images for Copyright Protection", Image Processing and its Applications, Jul. 4–6, 1995, Conference Publication No. 410, pp. 326–330.

L. Boney et al., "Digital Watermarks for Audio Signals".

Swanson et al., "Transparent Robust Image Watermarking", Proc. IEEE Int. Conf. On Image Proc. 1996.

J.J.K. O Ruanaidh et al., "Phase Watermarking of Digital Images".

I. Pitas, "A Method for Signature Casting on Digital Images".

C.T. Hsu et al., "Hidden Signatures in Images", ICIP 96 Conf. Proc., Sep. 16–19, 1996.

M. Schneider et al., "A Robust Content Based Digital Signature for Image Authentication", ICIP 96 Conf. Proc., Sep. 16–19, 1996.

S. Roche et al., "Multi–Resolution Access Control Algorithm Based on Fractal Coding", ICIP 96 Conf. Proc., Sep. 16–19, 1996.

K. Hirotsugu, "An Image Digital Signature System with ZKIP for the Graph Isomorphism", ICIP 96 Conf. Proc., Sep. 16–19, 1996.

R.B. Wolfgang et al., "A Watermark for Digital Images".

J.J.K. O Ruanaidh et al., "Watermarking Digital Images for Copyright Protection", EVA 96 Florence, pp. 1–7.

T. Aura, "Invisible Communication", Nov. 6, 1995.

D. Kahn, "Information Hiding—An Annotated Bibliography", Macmillan 1967, Library of Congress catalog No. 63–16109.

Craver et al., "Can Invisible Watermarks Resolve Rightful Ownerships?", IBM Research Report.

Podilchuk et al., "Digital Image Watermarking Using Visual Models", Proc. of EI '97, vol. 3016, Feb. 9–14, 1997.

Cox et al., "A review of watermarking and the importance of perceptual modeling", proc. of EI'97, vol. 3016, Feb. 9–14, 1997.

Watson, "DCT quantization matrices visually optimized for individual images", SPIE, vol. 1913, pp. 202–216.

Ahumada, Jr. et al., "Luminance–Model–Based DCT Quantization for Color Image Compression", SPIE, vol. 1666 (1992), pp. 365–374.

Hartung et al., "Digital Watermarking of Raw and Compressed Video", Systems for Video Communication, Oct. 1996, pp. 205–213.

| 0 | 1 | 2 | 3 | ... |
|---|---|---|---|---|
| 1 | 2 | 3 | 4 | ... |
| 2 | 3 | 4 | 5 | ... |
| 3 | 4 | 5 | 6 | ... |
| ⋮ | ⋮ | ⋮ | ⋮ | |

Figure 6

DIGITAL WATERMARKING

FIELD OF INVENTION

The present invention relates to digital watermarking of data including image, video and multimedia data. Specifically, the invention relates to the insertion and extraction of embedded signals for purposes of watermarking, in which the insertion and extraction procedures are repeatedly applied to subregions of the data. When these subregions correspond to the 8×8 pixel blocks used for MPEG and JPEG compression and decompression, the watermarking procedure can be tightly coupled with these compression algorithms to achieve very significant savings in computation.

BACKGROUND OF THE INVENTION

The proliferation of digitized media such as image, video and multimedia is creating a need for a security system which facilitates the identification of the source of the material.

Content providers, i.e. owners of works in digital data form, have a need to embed signals into video/image/multimedia data which can subsequently be detected by software and/or hardware devices for purposes of authenticating copyright ownership, control and management.

For example, a coded signal might be inserted in data to indicate that the data should not be copied. The embedded signal should preserve the image fidelity, be robust to common signal transformations and resistant to tampering. In addition, consideration must be given to the data rate that can be provided by the system, though current requirements are relatively low—a few bits per frame.

In U.S. patent application Ser. No. 08/534,894, filed Sep. 28, 1995,. entitled "Secure Spread Spectrum Watermarking for Multimedia Data" now abandoned and assigned to the same assignee as the present invention, which is incorporated herein by reference, there was proposed a spread spectrum watermarking method which embedded a watermark signal into perceptually significant regions of an image for the purposes of identifying the content owner and/or possessor. A strength of this approach is that the watermark is very difficult to remove. In fact, this method only allows the watermark to be read if the original image or data is available for comparison. This is because the original spectrum of the watermark is shaped to that of the image through a non-linear multiplicative procedure and this spectral shaping must be removed prior to detection by matched filtering and the watermark is inserted into the N largest spectral coefficients, the ranking of which is not preserved after watermarking. Thus, this method does not allow software and hardware devices to directly read embedded signals.

In an article by Cox et al., entitled "Secured Spectrum Watermarking for Multimedia" available at http://www.neci.nj.com/tr/index.html (Technical Report No. 95-10) spread spectrum watermarking is described which embeds a pseudo-random noise sequence into the digital data for watermarking purposes.

The above prior art watermark extraction methodology requires the original image spectrum be subtracted from the watermark image spectrum. This restricts the use of the method when there is no original image or original image spectrum available. One application where this presents a significant difficulty is for third party device providers desiring to read embedded information for operation or denying operation of such a device.

In U.S. Pat. No. 5,319,735 by R. D. Preuss et al entitled "Embedded Signalling" digital information is encoded to produce a sequence of code symbols. The sequence of code symbols is embedded in an audio signal by generating a corresponding sequence of spread spectrum code signals representing the sequence of code symbols. The frequency components of the code signal being essentially confined to a preselected signaling band lying within the bandwidth of the audio signal and successive segments of the code signal corresponds to successive code symbols in the sequence. The audio signal is continuously frequency analyzed over a frequency band encompassing the signalling band and the code signal is dynamically filtered as a function of the analysis to provide a modified code signal with frequency component levels which are, at each time instant, essentially a preselected proportion of the levels of the audio signal frequency components in corresponding frequency ranges. The modified code signal and the audio signal are combined to provide a composite audio signal in which the digital information is embedded. This component audio signal is then recorded on a recording medium or is otherwise subjected to a transmission channel. Two key elements of this process are the spectral shaping and spectral equalization that occur at the insertion and extraction stages, respectively, thereby allowing the embedded signal to be extracted without access to the unwatermarked original data.

In U.S. patent application Ser. No. 08/708,331, filed Sep. 4, 1996,entitled "A Spread Spectrum Watermark for Embedded Signaling" by Cox; now U.S. Pat. No. 5,848,155 and incorporated herein by reference, there is described a method for extracting a watermark of embedded data from watermarked images or video without using an original or unwatermarked version of the data. This work can be viewed as an extension of the original work of Preuss et al from the audio domain to images and video.

This method of watermarking an image or image data for embedding signaling requires that the DCT (discrete cosine transform) and its inverse of the entire image be computed. There are fast algorithms for computing the DCT in N log N time, where N is the number of pixels in the image. However, for N=512×512, the computational requirement is still high, particularly if the encoding and extracting processes must occur at video rates, i.e. 30 frames per second. This method requires approximately 30 times the computation needed for MPEG-II decompression.

One possible way to achieve real-time video watermarking is to only watermark every $N^{th}$ frame. However, content owners wish to protect each and every video frame. Moreover, if it is known which frames contain embedded signals, it is simple to remove those frames with no noticeable degradation in the video signal.

In U.S. patent application Ser. No. 08/715,953, filed Sep. 19, 1996,entitled "Watermarking of Image Data Using MPEG/SPEG Coefficients" by Cox, and incorporated herein by reference, there is described an alternative method, which is to insert the watermark into n×n blocks of the image (subimages) where n<<N. Then the computation cost is $$\frac{N}{n} n \log n = N \log n.$$

For $N=512\times512=2^{18}$ and $n=8\times8=2^6$, the asymptotic saving is only a factor of 3. However, empirically the cost of computing the DCT over the entire image may be significantly higher when cache, loop unfolding and other efficiency issues are considered. Thus, the practical difference may approach a 30 fold savings. More importantly, if the block size is chosen to be 8×8, i.e. the same size as that used for MPEG image compression, then it is possible to tightly couple the watermark insertion and extraction procedures to those of the MPEG compression and decompression algorithms. Considerable computational saving can then be achieved since the most expenses computations relate to the calculation of the DCT and its inverse and these steps are already computed as part of the compression and decompression algorithm. The incremental cost of watermarking is then very small, typically less than 5% of the computational requirements associated with MPEG.

The present invention improves the reliability of the invention described in the 08/715,953 application, now pending by storing watermark information into subimages, and extracting watermark information from subimages, in a manner different from that described earlier.

SUMMARY OF THE INVENTION

The present invention improves the reliability of the prior systems by systematically varying the order in which watermark signal components are inserted into each subimage, by inserting only part of the watermark signal into each subimage, and, during watermark detection, by combining the watermark signals found in groups of subimages to reconstruct the original watermark signal before testing for correlation with any predefined watermarks.

For detection, a reverse transformation is applied to each subimage to reconstruct the watermark information that was stored in that subimage. The resulting signals are then averaged together to reconstruct the whole watermark, and to reduce noise. Finally, this reconstructed watermark is compared against a predefined set of watermark signals to determine which one was inserted into the image.

A principal object of the present invention is therefore, the provision of inserting a subset of a watermark into a subset of subregions of data to be watermarked.

Another object of the invention is the provision of a digital watermarking system in which a watermark is extracted by averaging the watermarked signal from subregions of watermarked data, and then correlating the resulting signal to determine the watermark.

A further object of the invention is the provision of a digital watermarking system in which the watermark is composed of two portions, a verification portion and a synchronization portion, in order to improve watermark extraction reliability Further and still other objects of the invention will become more clearly apparent when the following description is read in conjunction with the accompanying drawing.

BRIEF DESCRIPTION OF THE DRAWINGS

Figure 6:
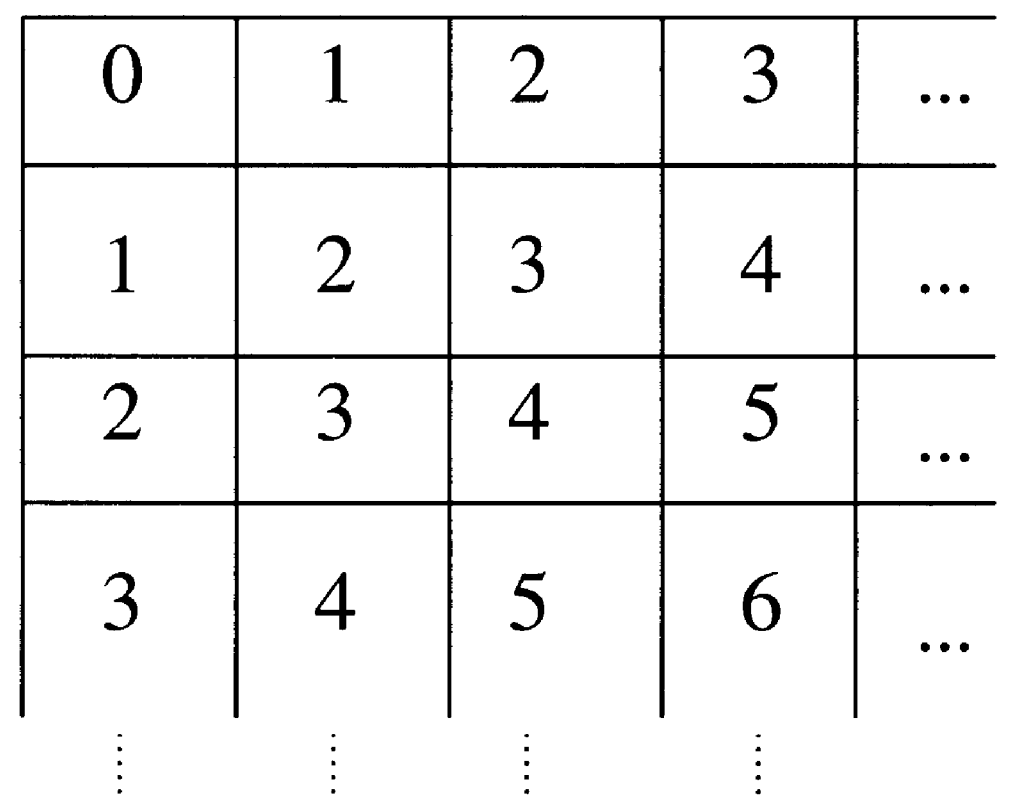

FIG. 6 is a graphic representation of rotation of PN sequences;

DETAILED DESCRIPTION

Referring now to the figures, and FIGS. 1 through 4 in particular, there is shown schematic block diagrams of a general method for inserting and detecting watermarks in digital data, for instance images.

In the following description, reference may be made to image data or images. While the invention has applicability to image data and images, it will be understood that the teachings herein and the invention itself are equally applicable to video, image and multimedia data and the term "image" and "image data" will be understood to include these terms where applicable. As used herein, "watermark" will be understood to include embedded data, symbols, images, instructions or any other identifying information.

In the following description, reference is made to procedures described in U.S. patent application Ser. No. 08/534,894 for inserting and extracting or detecting a watermark in images as INSERT-ORIGINAL and EXTRACT-ORIGINAL, respectively. Reference is made to procedures described in U.S. patent application Ser. No. 08/708,331 filed Sep. 4, 1996,now U.S. Pat. No. 5,848,155 for inserting and extracting or detecting watermarks in images as INSERT-WHOLE and EXTRACT-WHOLE, respectively. And reference is made to procedures described in U.S. patent application Ser. No. 08/715,953 for inserting and extracting or detecting watermarks in images as INSERT-MPEG-A and EXTRACT-MPEG-A, respectively.

Figure 1:
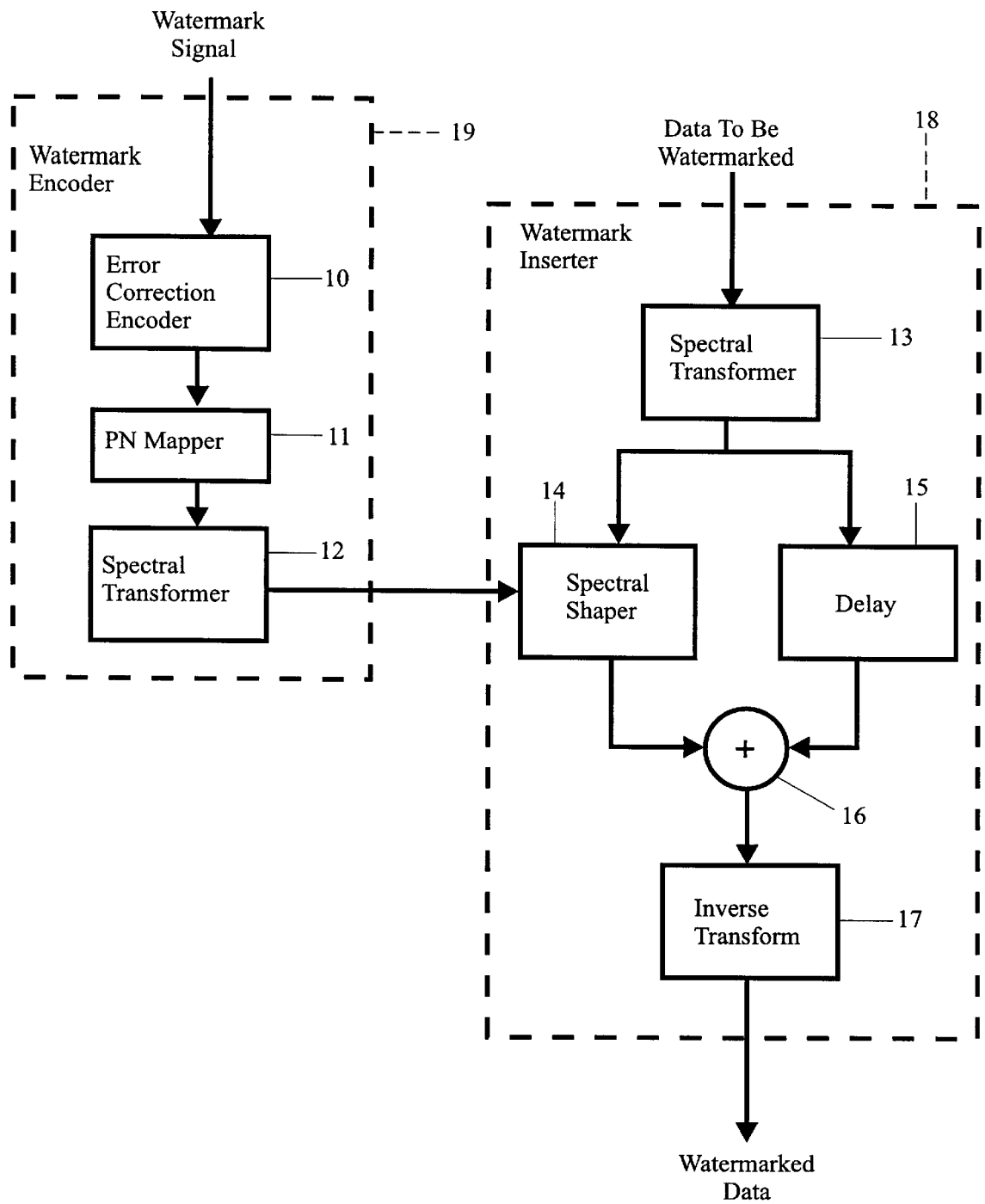
FIG. 1 is a schematic block diagram of watermark insertion procedure.

FIG. 1 shows a schematic block diagram of INSERT-WHOLE procedure for inserting watermarks into images. The watermark signal, in the form of a finite sequence of symbols chosen from an alphabet, is provided as an input to an error correction encoder 10 which transforms this sequence into another sequence that contains redundant information. The output of encoder 10 is provided to a PN-mapper 11, which maps each symbol of the encoded watermark into a pre-specified pseudo-random noise (PN) code. The output of the PN-mapper 11 is provided to a spectral transformer 12, which converts the pseudo-random noise sequence into the frequency domain. The conversion preferably is by discrete cosine transform (DCT), however, fast fourier transform, wavelet type decomposition and the like may also be used for frequency conversion. Concurrently, the data to be watermarked is provided to another spectral transformer 13. The outputs of the two spectral transformers 12 and 13 are then provided as inputs to a spectral shaper 14, which modifies the spectral properties of the pseudo-random noise codes from spectral transformer 12 to mask the watermark when added to the image data. The spectrally transformed data to be watermarked, from spectral transformer 13, is also provided as an input to a delay 15. The output of the spectral shaper 14 is then added to the output of delay 15 at a summer 16. The summer output is subject to an inverse transform 17. The result of the inverse transform is watermarked data.

INSERT-MPEG-A differs from INSERT-WHOLE by segmenting the data to be watermarked into multiple blocks, such as 8×8 pixel subimages or subregions. Each block of data then has the watermark inserted according to the above described method. That is, for each 8×8 subimage or subregion, a pseudo-random number (PN) sequence is inserted into the DCT coefficients after suitable spectral shaping. The procedure is repeated for all such subimages or subregions. The size of the subimage or subregion is preferably 8×8, but it can be of other sizes, such as 2×2, 3×3, 4×4 or 16×16.

Figure 2:
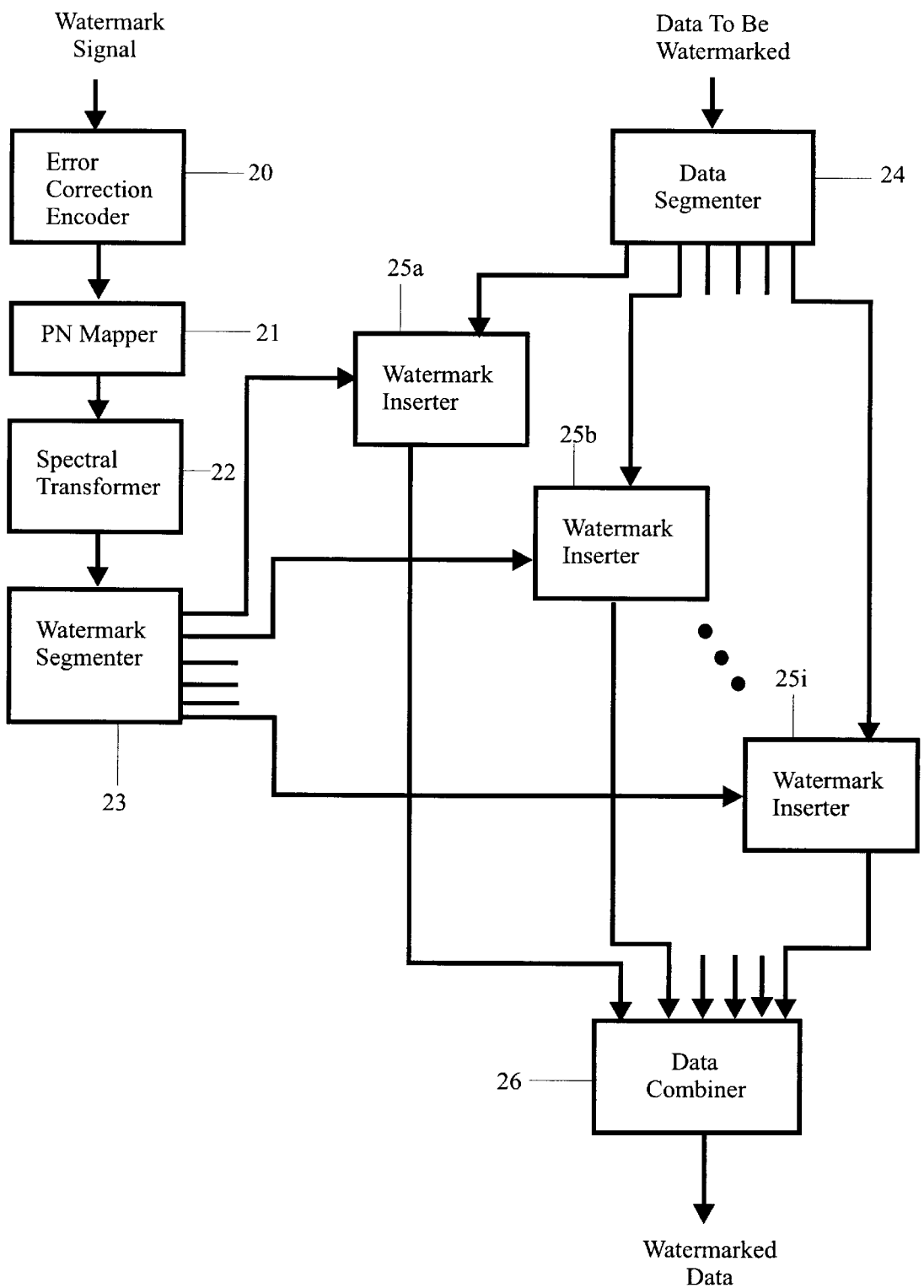
FIG. 2 is a schematic block diagram of a watermark insertion procedure in accordance with the teachings of the present invention.

FIG. 2 shows a schematic block diagram of a watermark insertion procedure in accordance with teachings of the present invention. The watermark signal is processed into a noise spectrum signal by the error correction encoder 20, the PN mapper 21, and the spectral transformer 22, in the same manner as described in conjunction with FIG. 1. However, unlike INSERT-WHOLE or INSERT-MPEG-A, the watermark is then used as an input to a watermark segmenter 23, which systematically separates the watermark into several subwatermarks. Any portion of the original watermark might appear redundantly in several of the resulting subwatermarks. Concurrently, the data to be watermarked is used as an input to data segmenter 24, which segments the data into blocks or subregions, such as 8×8 subimages, as in INSERT-MPEG-A. Each of the subwatermarks output by the watermark segmenter 23 is then inserted into a data block by one of the watermark inserters 25a, 25b, etc. The procedure used by the watermark inserters 25a, 25b, etc., is the same procedure described connection with watermark inserter 18 in FIG. 1. That is, each subwatermark is added into a spectrally transformed data block after spectral shaping, and the resulting data is then transformed back into the spatial domain. Finally, the watermarked data blocks from the watermark inserters 25a,25b, etc., are assembled by data combiner 26 to produce watermarked data.

Figure 3:
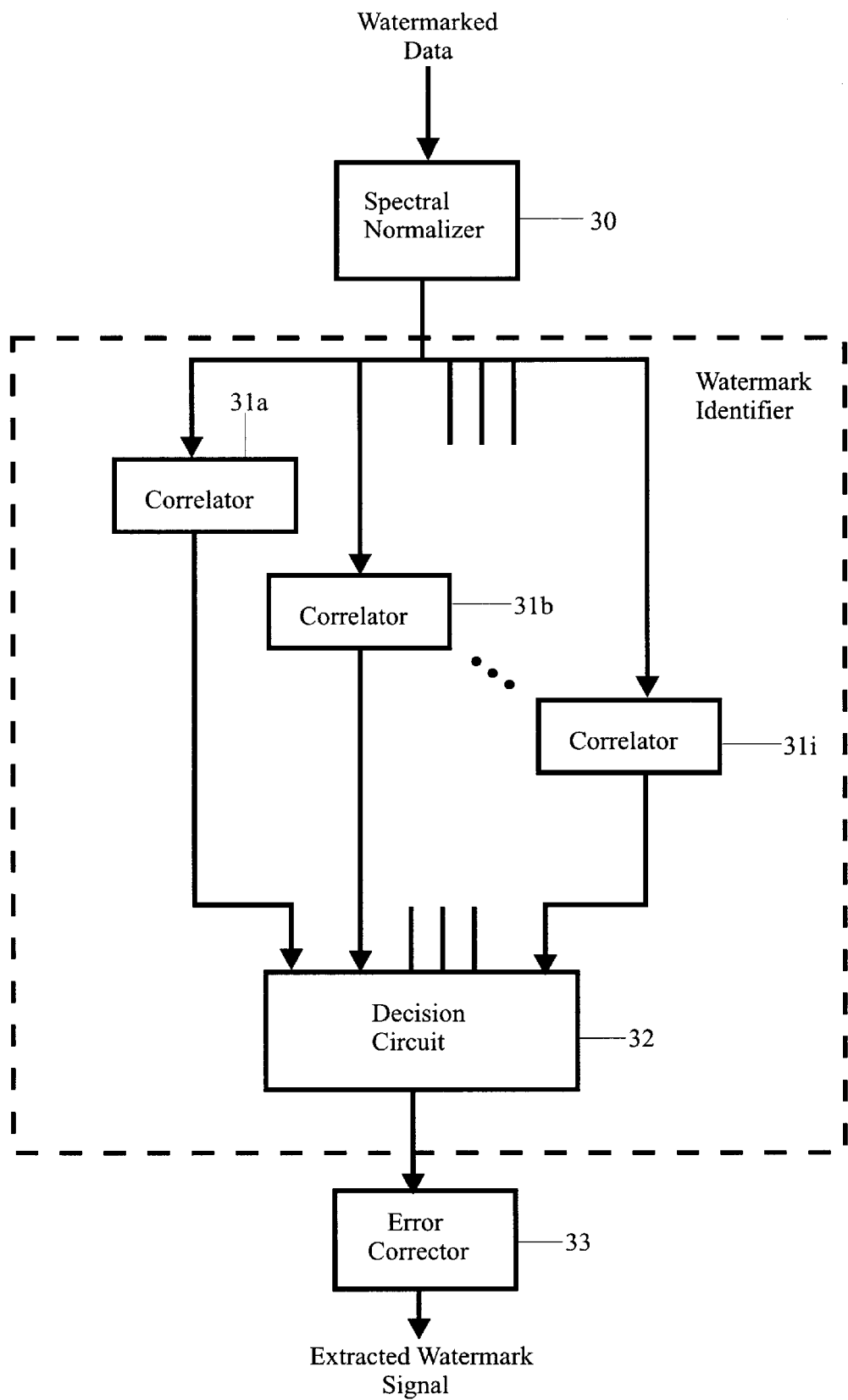
FIG. 3 is a schematic block diagram of a watermark extraction procedure.

FIG. 3 shows a schematic block diagram of the EXTRACT-WHOLE procedure. The watermarked image, video or multimedia data is first used as input into a spectral normalizer 30 to undo any previously performed spectral shaping. If the data contains a watermark, then the output of the spectral normalizer 30 will resemble the spectral transformation of the PN coding of that watermark (the signal that was input to the spectral shaper 14 in FIG. 1). The output of the spectral normalizer 30 is then used as an input to several correlators 31a, 31b, etc., which test the watermark with the PN codes used to represent the various symbols that the encoded watermark might contain (i.e. each correlator tests for one PN code that is used to encode a symbol by the PN mapper 11 of FIG. 1). The outputs of the correlators 31a, 31b, etc., are used as inputs to a decision circuit 32, which determines the most likely sequence of symbols. Finally, this sequence is corrected by an error corrector 33, which performs the inverse coding that was performed by the error correction encoder 10 in FIG. 1. The result is the extracted watermark.

In EXTRACT-MPEG-A, the data from which a watermark is to be extracted is first segmented into several blocks, such as 8×8 subimages, exactly as in INSERT-MPEG-A. The signal from each subimage is then normalized and used as input into a bank of correlators similar to the correlators 31a, 31b, etc. in FIG. 3. The output from the correlators is then averaged with the outputs of corresponding correlators from other subimages, and the resulting average correlations are used as inputs into the decision circuit 32 for subsequent processing as described above.

Figure 4:
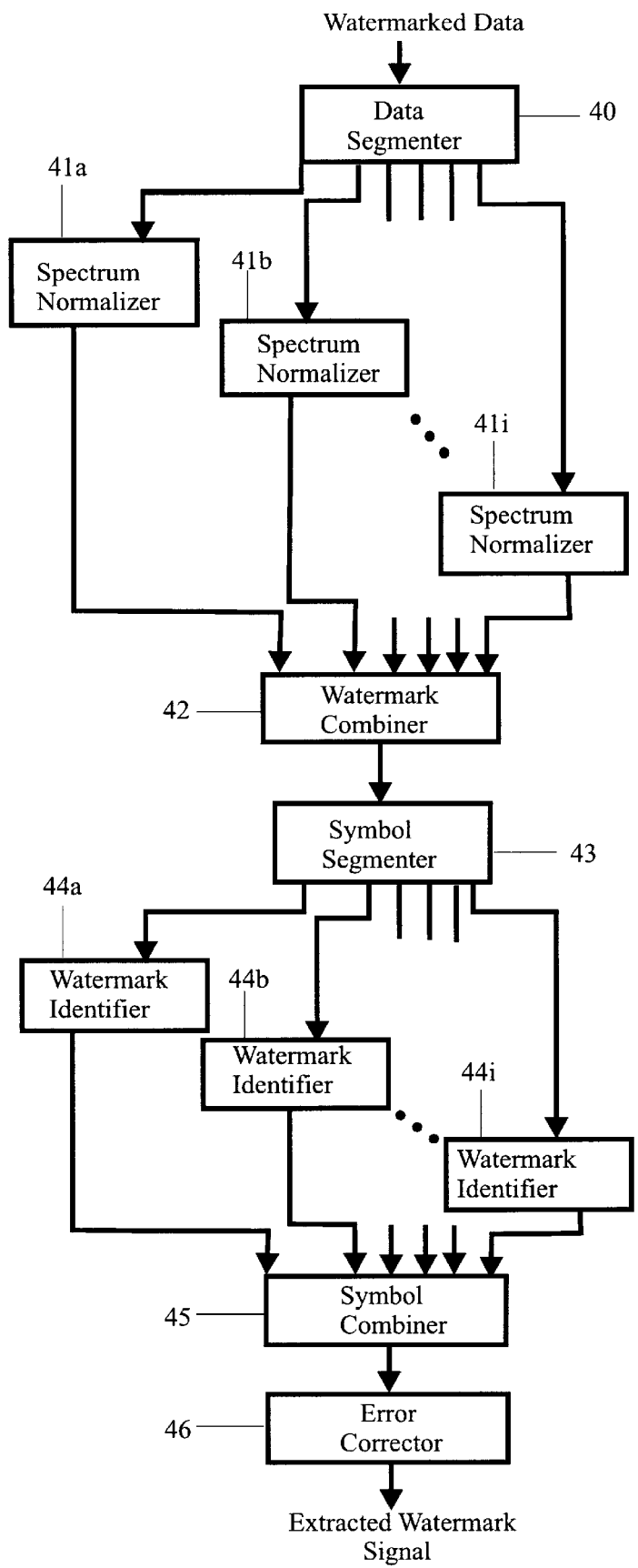
FIG. 4 is a schematic block diagram of a watermark extraction procedure in accordance with the teachings of the present invention.

FIG. 4 shows a schematic block diagram of a watermark extraction procedure in accordance with the teachings of the present invention. The watermarked data is first segmented into blocks by data segmenter 40, which corresponds to the data segmenter 24 used during the insertion procedure in FIG. 2. Each of the data blocks is provided to a respective spectrum normalizer 41a, 41b, etc. to produce a signal resembling the subwatermark that was inserted into the respective data block. These inserted subwatermark signals are then used as inputs into a watermark combiner 42. In the combiner 42, parts of the watermark that appear redundantly in several subwatermarks are averaged together to reduce noise. The output of the watermark combiner 42 is provided as the input to a symbol separator 43 which divides the watermark into parts, each of which corresponds to one symbol from the encoded watermark signal (the output of error correction encoder 20 in FIG. 2).

These symbols from separator 43 are provided as inputs to respective watermark identifiers 44a, 44b etc. each of which includes of a bank of correlators and a decision circuit, as shown in FIG. 3. The outputs of the watermark identifiers are symbols from the alphabet used in the original encoded watermark signal. The identified symbols are reassembled into a complete encoded watermark by the symbol combiner 45. Finally, the resulting encoded watermark is decoded by the error corrector 46.

The insertion and extraction procedures will now be described in more detail. In INSERT-ORIGINAL and EXTRACT-ORIGINAL, the object is to embed a single PN (pseudo random number) sequence into an image when the original image is available at the time of extraction. The information associated with the PN sequence is assumed to be stored in a database together with the original image and the spectral location of the embedded watermark. The locations of the watermarked components has to be recorded because the implementation approximated the N perceptually most significant regions of the watermark by the N largest coefficients. However, this ranking was not invariant to the watermarking process. The N largest coefficients may be different after inserting the watermark than before inserting the watermark.

In order to avoid this problem, the present invention places a watermark in predetermined locations of the spectrum, typically the first N coefficients. However, any predetermined locations could be used, though such locations should belong to the perceptually significant regions of the spectrum if the watermark is to survive common signals transformations such as compression, scaling, etc.

More generally, the information to be embedded is a sequence of m symbols drawn from an alphabet A (e.g. the binary digits or the ASCII symbols). This data is then supplemented with additional symbols for error detection and correction. Each symbol is then spread spectrum modulated, a process that maps each symbol into a unique PN sequence known as a chip. The number of bits per chip is preset - the longer the chip length, the higher the detected signal-to-noise ratio will be, but this is at the expense of signaling bandwidth.

The power spectrum of the PN sequence is white, i.e. flat, and is therefore shaped to match that of the "noise", i.e. the image/video/audio/or multimedia data into which the watermark is to be embedded. It is this spectral shaping that must be modified from the prior methods so that the extraction process no longer requires the original image. To do this, each coefficient of the watermarked spectrum is scaled by the local average of the power in the image spectral coefficient rather than the coefficient itself, i.e.

$$f_i' = f_i + \alpha \text{avg}(|f_i|) W_i \quad (1)$$

The averaging is the averaging of the absolute coefficient values and not the coefficient values themselves. This is effectively estimating the average power present at each frequency. Other averaging procedures are possible, for example, averaging over several frames or average of local neighborhoods of 8×8 blocks.

This average may be obtained in several ways. It may be a local average over a two dimensional region. Alternatively, the two dimensional spectrum may be sampled to form a one dimensional vector and a one dimensional local average may be performed. One dimensional vectorization of the two dimensional 8×8 DCT coefficients is already performed as part of MPEG II. The average may be a simple box or weighted average over the neighborhood.

For video data, temporal averaging of the spectral coefficients over several frames can also be applied. However, since several frames are needed for averaging at the spectral normalization stage of the extractor, the protection of individual video frames taken in isolation may not be possible. For this reason, the present invention treats video as a very large collection of still images. In this way, even individual video frames are copy protected.

In order to extract the watermark, it is necessary to perform the spectral normalization, in which the previously performed spectral shaping procedure is inverted. In the present invention, the original unwatermarked signal is not available. Thus, the average power of the frequency coefficients, $avg(|f_i|)$, is approximated by the average of the watermarked signal, i.e. $avg(|f_i'|)$ $$avg(|f_i|) \approx avg(|f_i'|) \tag{2}$$

This is approximately true since $\alpha avg(|f_i|)W_i <<f_i$, where $W_i$ is the watermark component, and $\alpha$ is a constant typically in the range between 0.1 and 0.01.

The normalization stage then divides each coefficient ($f_i'$) in the received signal by the local average $avg(|f_i'|)$ in the neighborhood.

That is, $$\frac{f_i'}{avg(|f_i'|)} = \frac{f_i + \alpha avg(|f_i|)W_i}{avg(|f_i|)} \tag{3}$$
$$\approx \frac{f_i'}{avg(|f_i'|)} + \alpha W_i$$

The first term, on the right hand side (RHS) of Equation (3), $$\frac{f_i}{avg(|f_i'|)},$$

is considered a noise term. This term was not present in the system described in U.S. patent application Ser. No. 08/534,894, because access to the unwatermarked coefficients allowed this term to be removed. The second term $\alpha W_i$ is the original watermark signal which can now be detected using conventional correlation.

If the watermark is extracted from any single 8×8 block, the detector reliability is very low. If, however, the watermarks extracted from each 8×8 block are first added together and the averaged watermark is then applied to the correlator, then a very strong and unambiguous response is obtained. This differs from the method described in U.S. patent application Ser. No. 08/715,953 in which correlation occurred within each block and the output from each correlator was averaged together. The present invention was found to improve the detection response and significantly reduced the computation requirement associated with each block.

In practicing the present invention preferably there is a unique PN sequence for each symbol in the alphabet. The method is relatively robust to clipping since the detector output reduces linearly with the quantity of 8×8 subimage blocks in the image. For DVD (digital video disk) embedded signaling for APS (analog protection system) and CGMS (copy generation management system), there would be a total of 8 or 16 PN sequences.

The number of 8×8 blocks in a 512×512 image is 4096, suggesting that significantly more than one of 16 symbols can be embedded in an image or video frame. Assume, for example, that it is desired to embed 1 out of 128 symbols in an image. It is necessary to perform 128 parallel correlations. This is computationally tractable but hardware implementations of each correlation become more complex. An alternative method is to only use two binary symbols. It may be preferable to associate more than one PN sequence with each of the two binary symbols or bits in order to increase the difficulty of intentionally removing the watermark. In this case, there are only two correlators and a binary string may be embedded into the image. The raw bit error rate will be very high due by the low detector output. However, this can be reduced to acceptable levels by using error correcting codes, such as Reed-Solomon (RS). RS codes are robust to burst error which may occur because of clipping of the image. Other error correcting codes may also be used.

When using this method, it is necessary for the receiver to know the start location of the encoded block. The start location may not be obvious, particularly when the image has been subjected to clipping. However, convention synchronizing methods can be used; such as preceding each block with a special or unique symbol or string of symbols.

To insert a watermark, each 8×8 block is treated as an individual subimage or subregion. The DCT of the subimage is then computed and the two dimensional DCT is vectorized in the zigzag pattern shown in FIG. 5, although other patterns are also possible. These two stages constitute most of the calculations but are part of the MPEG encoding process. Next, a PN noise sequence $\{w_1 \ldots w_n\}$ is inserted into the DCT coefficients using Equation 1 as before. The length of the PN sequence cannot exceed 64 (in an 8×8 block) and is typically much shorter, in the range of 11 to 25. If only a single code is to be inserted into the image, then the same PN sequence is inserted into each of the 720 × 480/64 −5400 blocks. However, a variation may be performed at this point in the procedure. Within each row of blocks, the PN sequence is cyclically rotated by one frequency coefficient prior to insertion in the subsequent block. Similarly, the PN sequence is cyclically rotated by one frequency coefficient at the start of each new row. FIG. 6 illustrates an order of rotations.

The purpose of these rotations or shifts is to improve the response of the watermark extraction stage. Earlier experiments revealed that certain DCT coefficients were more difficult to estimate than others. The location at these coefficients varied from image to image. However, within an image, the coefficient could be consistently poor. Consequently, without shifting, one or more of the estimated watermark coefficients could be significantly degraded relative to the other watermark coefficients, thereby reducing the detector performance. Conversely, shifting significantly reduces the effect a poor DCT coefficients has on a single watermark coefficient and the detector performance is markedly improved. Note that any cyclic pattern can be used.

Further modifications are useful once rotation of the watermark has been introduced. First, the length of the watermark may now be significantly greater than 64.Then, for each block only a small subset of the watermark (say five) coefficients is inserted into the first five DCT coefficients (excluding the d.c. term). Because of the rotation, a different subset of the watermark is inserted into neighboring 8×8 blocks. Finally, having completed the watermark insertion, the MPEG encoder is able to proceed with the subsequent stages of compression.

Note that the watermark may also be inserted after the MPEG quantization stage to reduce distortion of the watermark. MPEG-2 performs a convenient one dimension vectorization called "zigzagging", which allows a simple 3×1 box average to be performed on the coefficients (excluding the d.c. term).

Figures 5, 7:
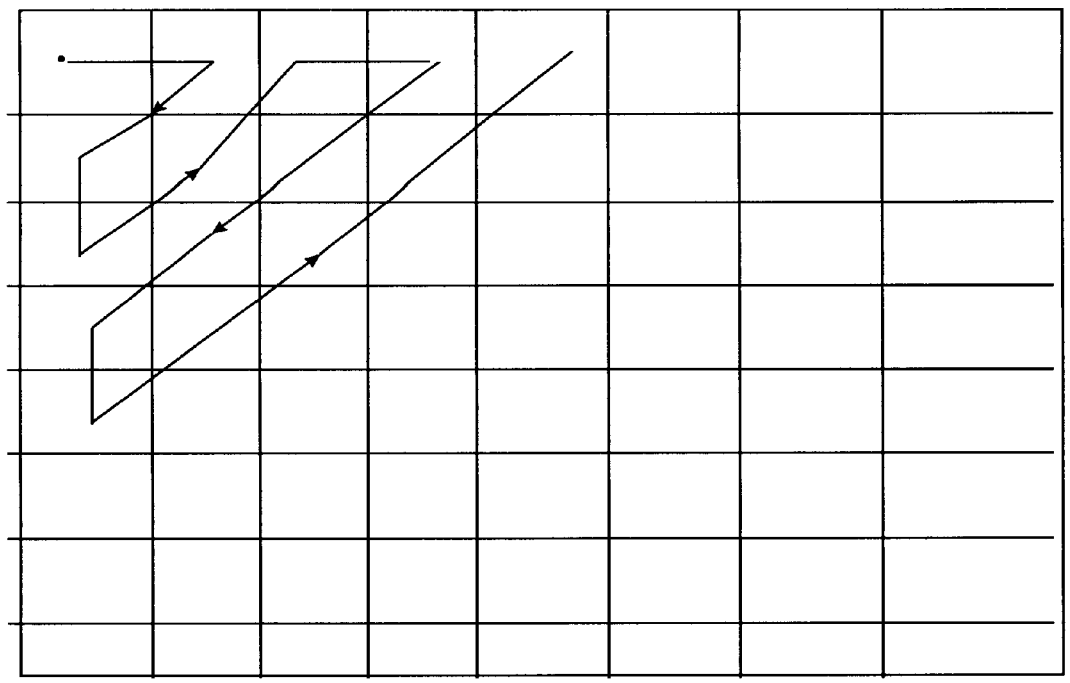
FIG. 5 is a graphic representation of a zigzag pattern useful for vectorizing subimages.
FIG. 7 is a graphical representation of an 8×8 block shown the spatial relation of averaged terms.

In practice, performance was improved if the averaging is performed using the 2 four-connected coefficients closest to the d.c. term, as illustrated in FIG. 7, i.e. the two coefficients above and to the left.

Watermark detection begins by first extracting the PN noise sequence from each 8×8 block using Equation 1.For each block, the PN sequence is then cyclically shifted in the opposite direction by one frequency coefficient, and the average over all the blocks is then computed. In practice, this process can be computed incrementally and does not require temporary storage of all the extracted watermarks. A weighted averaging can also be applied, where the weights are determined based on their susceptibility to common signal transformations such as low pass filtering. Finally, the average watermark is compared with the original PN sequence via correlation. The reason for shifting the watermark in the column direction may now be apparent. If the image is clipped on an arbitrary block boundary, then the computed average watermark will simply be rotated by an amount that is a function of the relative location of the clipped portion of the image. Correlation can then be performed on all permutations (typically 11 to 25) of the watermark. The output from the correlator with the maximum value is then used for decision purposes. The extraction stage is depicted in FIG. 4. Taking the maximum correlator output over all rotations of the watermark can cause the decision circuitry to be noisy. To improve this, the watermark is broken into two pieces; a synchronization portion is of length K and a verification portion is N-K. Then, when the watermark is extracted as before, correlation is first performed only on all rotations of the synchronization portion of this watermark. The maximum correlation output is noted, then the verification portion of the watermark is rotated by the corresponding amount and a second correlation is performed on the verification portions of the watermarks. This process significantly improves the overall reliability of the system. In the course of experimentation, it was noticed that some watermarks performed better than others on the same imagery. This was caused by variation in the correlation statistics between the synchronization and verification portions of the watermark. Ideally, the two portions should have very low correlations. However, in several cases where watermarks performed poorly, it was traced to unexpected correlations between the two portions.

The present invention provides a modification to digital watermarking methods in which the original data is required for watermark extraction thereby enabling watermarking extraction in the absence of an unwatermarked or original data. The present invention preferably uses MPEG/JPEG coefficients. An image is divided into typically 8×8 block subimages or subregions and each subimage is processed and the results are combined to derive the extracted watermark. The result is extraction of the watermark with very high confidence.

While the above invention describes improvements to the prior-art INSERT-WHOLE, INSERT-MPEG-A, EXTRACT-WHOLE, and EXTRACT-MPEG-A algorithms, it should be apparent to anyone skilled in the art that the same improvements may be applied to any algorithm for inserting and extracting watermarks in image data. This more general view of the present invention is shown in FIGS. 8 and 9.

Figure 8:
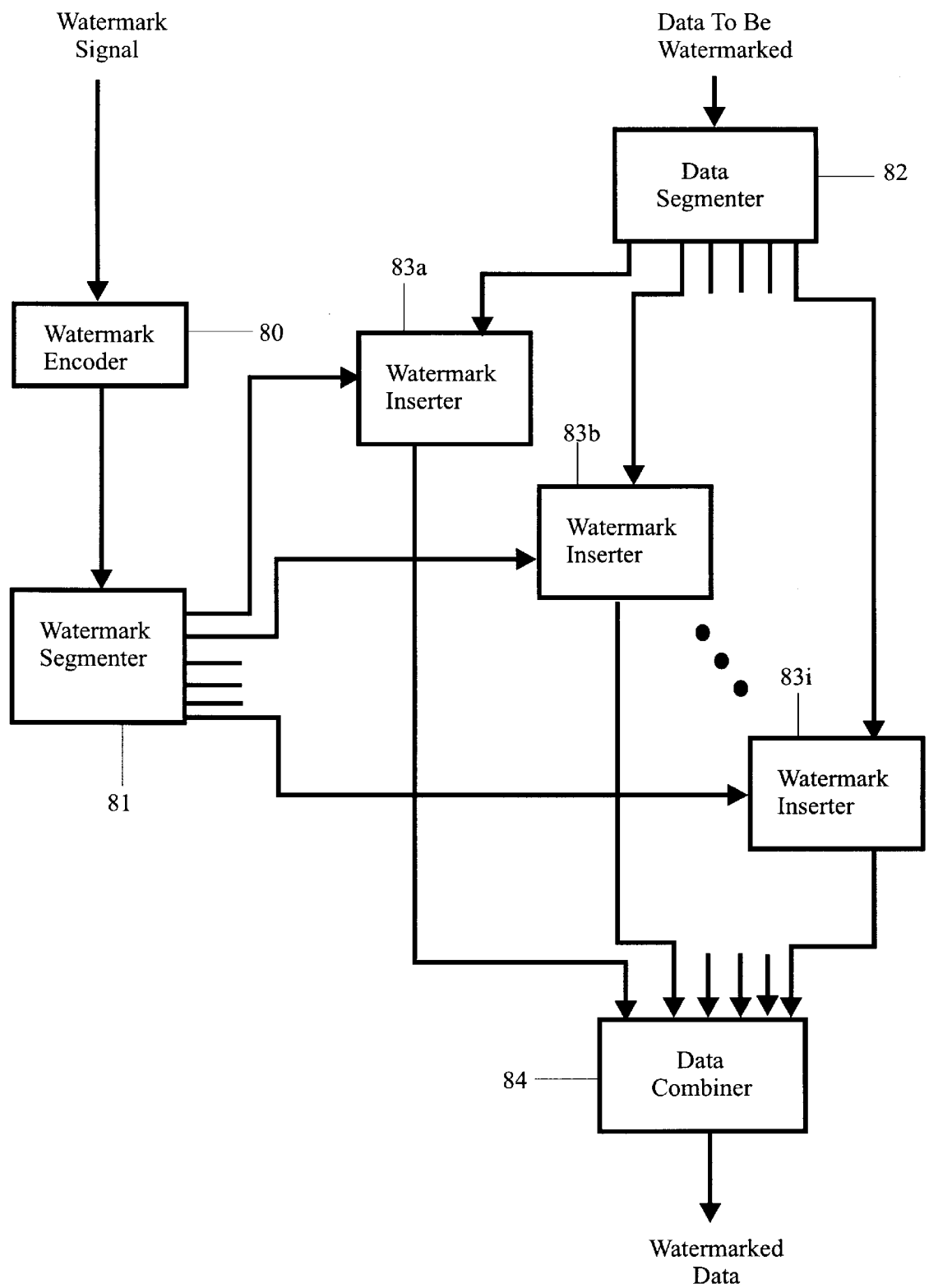
FIG. 8 is a schematic block diagram of a method for inserting watermarks in accordance with the present invention.

FIG. 8 shows a schematic block diagram of the general method for inserting watermarks. This general method makes use of a non-block-based watermark insertion algorithm, which shall be referred to hereafter as the "base insertion algorithm". The watermark encoder 80 converts the watermark into a form appropriate for the base insertion algorithm. If the base insertion algorithm is that shown in FIG. 1, for example, then the watermark encoder 80 corresponds to the watermark encoder 19, which comprises the error correction encoder 10, the PN mapper 11, and the spectral transformer 12. However, if a different base insertion algorithm is to be used, then the watermark encoder 80 may perform a different transformation of the watermark. The encoded watermark signal from watermark encoder 80 is provided as an input to watermark segmenter 81, which divides the watermark into a set of subwatermarks. Any portion of the original watermark might appear redundantly in several of the resulting subwatermarks. The data to be watermarked is provided as an input to data segmenter 82, which divides the data into subregions. Each subwatermark is inserted into a respective data subregion by a watermark inserter 83a, 83b, etc. The watermark inserters implement the base insertion algorithm, so, if the base insertion algorithm is that shown in FIG. 1, then each watermark inserter 83a, 83b, etc., corresponds to the watermark inserter 18, which comprises a spectral transformer 13, a spectral shaper 14, a delay 15, a summer 16, and an inverse transform 17. However, if a different base insertion algorithm is to be used, then the watermark inserters 83a, 83b, etc., may employ a different method of inserting subwatermarks into the subregions of the data to be watermarked. The outputs from the watermark inserters are assembled in data combiner 84 to provide watermarked data.

Figure 9:
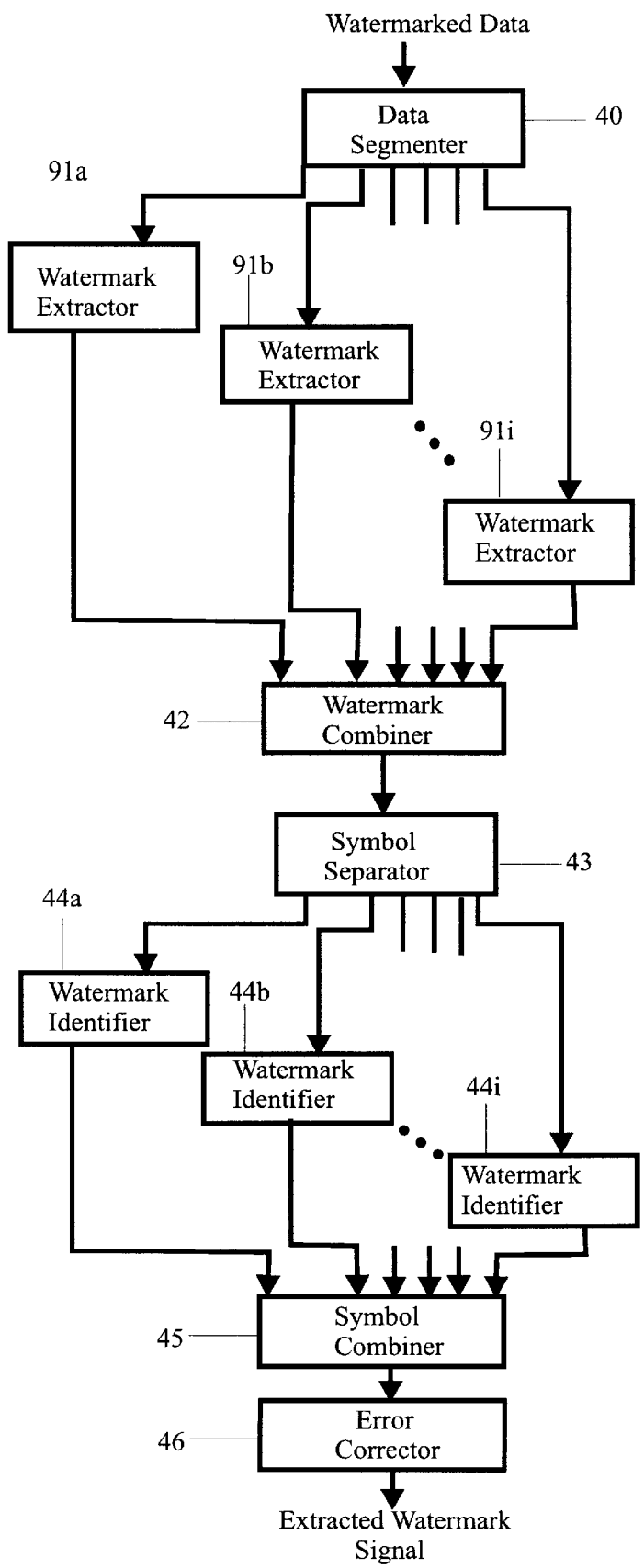
FIG. 9 is a schematic block diagram of a method for extracting watermarks in accordance with the present invention.

FIG. 9 shows a schematic block diagram of the corresponding general extraction algorithm. The algorithm makes use of a "base extraction" algorithm that corresponds to the base insertion algorithm used in inserting the watermark into the data to be watermarked (FIG. 8). The algorithm in FIG. 9 is substantially the same as the algorithm shown in FIG. 4, except that, in the general case, the spectrum normalizers 41a, etc. are replaced by watermark extractors 91a, etc., which implement the base extraction algorithm. That is, if the base insertion algorithm used was the algorithm shown in FIG. 1, then the watermark extractors 91a, etc., in FIG. 9 will be the spectrum normalizers 41a, etc. in FIG. 4.

While there has been described and illustrated a system for inserting a watermark into and extracting a watermark from watermarked data without using an unwatermarked version of the data, it will be apparent to those skilled in the art that variations and modifications are possible without deviating from the broad principles and teachings of the present invention which shall be limited solely by the scope of the claims appended hereto.

What is claimed is:

1. A method for inserting a watermark signal into data to be watermarked comprising the steps of:

dividing data to be watermarked into a plurality of subregions;

computing frequency coefficients of the data to be watermarked in each subregion;

spread spectrum modulating a watermark signal to be inserted by mapping the watermark signal into a PN (pseudo-random noise) sequence;

spectral shaping the PN sequence as a function of the average power in each frequency coefficient of the data; and inserting each spectral shaped PN sequence into predetermined coefficients in the data in each subregion.

2. A method for inserting a watermark signal into data to be watermarked as set forth in claim 1, where said inserting is performed after the data undergoes MPEG quantization processing.

3. A method for inserting a watermark signal into data to be watermarked as set forth in claim 1, where said frequency coefficients are DCT (discrete cosine transform) coefficients.

4. A method for inserting a watermark signal into data to be watermarked as set forth in claim 3, where each subregion is a 8×8 block of pixels.

5. A method for inserting a watermark signal into data to be watermarked as set forth in claim 4, where said inserting is performed after the data undergoes MPEG quantization processing.

6. A method for inserting a watermark signal into data to be watermarked as set forth in claim 1, where each subregion is a 8×8 block of pixels.

7. A method for inserting a watermark signal into data to be watermarked as set forth in claim 6, where said inserting is performed after the data undergoes MPEG quantization processing.

8. A method for inserting a watermark signal into data to be watermarked as set forth in claim 6, where the frequency coefficients of the watermark signal are rotated prior to inserting of each spectral shaped PN sequence into the subregion.

9. A method for inserting a watermark signal into data to be watermarked as set forth in claim 8, where said inserting is performed after the data undergoes MPEG quantization processing.

10. A method for inserting a watermark signal into data to be watermarked as set forth in claim 8, where only a subset of the watermark signal frequency coefficients is inserted into any one subregion.

11. A method for inserting a watermark signal into data to be watermarked as set forth in claim 10, where the watermark signal comprises a synchronization portion and a verification portion.

12. A method for inserting a watermark signal into data to be watermarked as set forth in claim 11, where said inserting is performed after the data undergoes MPEG quantization processing.

13. A method for inserting a watermark signal into data to be watermarked as set forth in claim 11, where the synchronization portion and the verification portion have very little correlation between each other.

14. A method for inserting a watermark signal into data to be watermarked as set forth in claim 1, where the spectral shaping as a function of the average power is typically 3×1 window of the coefficient obtained from the one-dimensional vectorization by zigzagging of two-dimension frequency coefficients.

15. A method for inserting a watermark signal into data to be watermarked as set forth in claim 1, where the spectral shaping is a function of the average power based on the two four-connected frequency coefficients closest to the DC term.

16. A method of extracting a watermark from watermarked data comprising the steps of:

receiving subregions of watermarked data;

spectrum normalizing the watermarked data as a function of the average power in each frequency coefficient of the watermarked data in each subregion to generate respective normalized signals;

combining the respective normalized signals from each subregion to generate a single watermark;

correlating the single watermark with predetermined PN (pseudo-random noise) sequences corresponding to predetermined symbols to provide correlated signals for each predetermined PN sequence in each subregion;

deciding which correlated signal is most likely a current symbol; and extracting a sequence of most likely current symbols corresponding to the watermark.

17. A method of extracting a watermark from watermarked data as set forth in claim 16, where the subregions are 8×8 blocks used for MPEG encoding and decoding.

18. A method of extracting a watermark from watermarked data as set forth in claim 17, where said combining the normalized signals from each subregion to generate a single watermark, including removing the relative rotation of the watermark between blocks.

19. A method of extracting a watermark from watermarked data as set forth in claim 18, further comprising subsequently reconstructing the watermark from partial watermarks inserted into each block.

20. A method of extracting a watermark from watermarked data as set forth in claim 19, further comprising weighting the watermark coefficients based on their location within the frequency spectrum, where the weighting is a function of the susceptibility of each frequency coefficient to common signal transformations.

21. A method of extracting a watermark from watermarked data as set forth in claim 16, further comprising correlating with all rotational shifts of the extracted watermark and selecting the maximum value.

22. A method of extracting a watermark from watermarked data as set forth in claim 16, further comprising correlating with all rotational shifts of a synchronization portion of a watermark to determine a maximum value and subsequently rotating a verification portion of the watermark by the same amount as the synchronization portion is rotated to obtain the maximum value prior to correlating between the verification portion and predetermined PN sequences.

23. A method of extracting a watermark from watermarked data comprising the steps of:

receiving subregions of watermarked data;

spectrum normalizing the watermarked data as a function of the average power in each frequency coefficient of the watermarked data in each subregion to generate respective normalized signals;

correlating the respective normalized signals with predetermined PN sequences corresponding to predetermined symbols to provide correlated signals for each predetermined PN sequence in each subregion;

deciding which correlated signal is most likely a current symbol in each subregion for providing an extracted symbol stream;

error correcting the extracted symbol stream; and extracting a sequence of most likely current symbols corresponding to the watermark.

24. A method of extracting a watermark from watermarked data as set forth in claim 23, where said error correction is Reed Solomon error correction.

25. A method for inserting a watermark signal into data to be watermarked comprising the steps of:

dividing data to be watermarked into a plurality of subregions;

dividing a watermark signal into a plurality of subwatermarks where portions of the watermark are contained in more than one subwatermark; and inserting said plurality of subwatermarks into said plurality of subregions.

26. A method for inserting a watermark signal into data to be watermarked as set forth in claim 25, where each subwatermark is inserted into a respective subregion, so that each subregion contains at least one subwatermark.

27. A method for extracting a watermark signal from watermarked data comprising the steps of:

receiving a plurality of subregions of watermark data;

extracting a subwatermark from each subregion of said plurality of subregions; and combining and averaging the subwatermarks extracted from all the subregions to obtain a signal commensurate with the watermark signal.

28. A method for extracting a watermark signal from watermarked data as set forth in claim 27, further comprising the steps of:

dividing the signal commensurate with the watermark signal into a plurality of symbol signals;

correlating each symbol signal with a set of predefined signals;

determining which predefined signal best corresponds to each symbol signal; and combining the best corresponding predetermined signals to generate the watermark signal.

* * * * *